(12) United States Patent
Motohashi et al.

(10) Patent No.: US 8,986,804 B2
(45) Date of Patent: Mar. 24, 2015

(54) METHOD FOR PRODUCING STRUCTURAL MEMBER AND STRUCTURAL MEMBER

(75) Inventors: Hideto Motohashi, Aichi (JP); Yoshifumi Hosokawa, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 246 days.

(21) Appl. No.: 13/578,129

(22) PCT Filed: Feb. 9, 2011

(86) PCT No.: PCT/JP2011/000708
§ 371 (c)(1),
(2), (4) Date: Aug. 29, 2012

(87) PCT Pub. No.: WO2011/099271
PCT Pub. Date: Aug. 18, 2011

(65) Prior Publication Data
US 2012/0328819 A1 Dec. 27, 2012

(30) Foreign Application Priority Data
Feb. 10, 2010 (JP) ................................. 2010-027673

(51) Int. Cl.
*B32B 3/14* (2006.01)
*B29D 99/00* (2010.01)
*B64C 3/18* (2006.01)

(52) U.S. Cl.
CPC ............ *B29D 99/0003* (2013.01); *B64C 3/185* (2013.01); *Y02T 50/433* (2013.01); *Y02T 50/43* (2013.01)
USPC ................ 428/61; 428/58; 428/119; 428/122

(58) Field of Classification Search
CPC ...... B29C 70/30; B29C 70/34; B29C 70/342; B29C 70/345; B29C 70/347
USPC ........................ 428/58, 61, 119, 122; 244/133
See application file for complete search history.

(56) References Cited

U.S. PATENT DOCUMENTS

2010/0136293 A1* 6/2010 Kubryk et al. ................. 428/156
2012/0097321 A1* 4/2012 Liguore et al. ................. 156/184

FOREIGN PATENT DOCUMENTS

| JP | 61-043540 A | 3/1986 |
| JP | 2008-110539 A | 5/2008 |
| JP | 2008-290421 A | 12/2008 |
| JP | 2009-178863 A | 8/2009 |

OTHER PUBLICATIONS

Machine translation of JP 2008-290421 retrieved Sep. 14, 2014.*
International Preliminary Report on Patentability for PCT/JP2011/000708; Feb. 9, 2011.
International Search Report for PCT/JP2011/000708; Apr. 26, 2011.

* cited by examiner

*Primary Examiner* — Alexander Thomas
(74) *Attorney, Agent, or Firm* — Perne & Gordon LLP

(57) ABSTRACT

A narrow prepreg sheet 20N is bonded along a ridge C, and wide prepreg sheet 20W is bonded to other portions, whereby the wide prepreg sheet 20W having no cut line is bonded to both side portions of the ridge C.

In a portion in which a spar 10 is curved, the narrow prepreg sheet 20N is bonded in an axial direction of the spar 10 while divided into plural pieces, and a length of the narrow prepreg sheet 20N is adjusted according to a radius of curvature of the curved portion in the axial direction of the spar 10, whereby various radii of curvature are easily dealt with.

14 Claims, 3 Drawing Sheets

METHOD FOR PRODUCING STRUCTURAL MEMBER AND STRUCTURAL MEMBER

TECHNICAL FIELD

The present invention relates to a method for producing a structural member including a composite material, and the structural member.

BACKGROUND ART

In the case that a wing of an aircraft is made of a composite material including a carbon fiber or a glass fiber, a spar (beam member) having a U-shape in section is provided as a part of a structural member for the wing.

As illustrated in FIGS. 3A and 3B, a spar 1 formed into the U-shape in section, includes a web 2 and flanges 3 and 3 provided at both ends of the web 2.

In the case that the spar 1 is made of the composite material, sometimes a prepreg sheet in which a carbon fiber or a glass fiber is impregnated with a resin to form a sheet is used. In the case that the spar 1 is constructed by the prepreg sheet, the prepreg sheets are stacked to form plural layers. At this point, in each layer, a prepreg sheet 5 strip having a predetermined width is bonded such that a fiber direction of the carbon fiber or the glass fiber becomes a predetermined angle. In the prepreg sheets 5 that are vertically stacked next to one another, the prepreg sheets 5 are stacked such that the fiber direction of the prepreg sheet 5 varies. For example, when an axial direction of the spar 1 is set to 0°, the prepreg sheets 5 are bonded while a fiber direction of the prepreg sheet 5 is changed to 0°, 45°, 90°, . . . . Thus, strength of the spar 1 is enhanced in many directions.

In the case that the spar 1 is curved in the axial direction thereof in forming the spar 1, a wrinkle is easily generated in the prepreg sheet 5 in a ridge 4 that is of a boundary portion of the web 2 and the flange 3. Particularly, the generation of the wrinkle becomes prominent in the case that the angle of the bonding direction of the prepreg sheet 5 is as small as 0° with respect to the axial direction of the spar 1. This is because the prepreg sheet 5 has a poor stretch property in the fiber direction. In the case of the severe curvature, the wrinkle is easily generated in the prepreg sheet 5 in a portion in which the prepreg sheet 5 is three-dimensionally curved by the curvature in a direction in which the ridge 4 is continued in addition to the curvature by the web 2 and the flange 3 in a plane orthogonal to the ridge 4.

Conventionally, in the ridge 4 and a surrounding area thereof, a slit 6 is provided in a direction substantially orthogonal to the fiber direction in the belt-like prepreg sheet 5 when the prepreg sheets 5 are stacked. A gap between both sides of the slit 6 of the prepreg sheet 5 that is formed into a rectangular shape on both sides of the slit 6 is widened on an outer circumferential side in the curvature direction of the ridge 4. On an inner circumferential side in the curvature direction of the ridge 4, the prepreg sheet 5 portions on both the sides of the slit 6 are overlapped with each other, and the overlapped portion is removed (for example, see Patent Document 1).

CITATION LIST

Patent Document

Patent Document 1: Japanese Patent Application Laid-Open No. 2009-178863

SUMMARY OF THE INVENTION

Technical Problems to be Solved by the Invention

However, when the slit 6 is provided in the prepreg sheet 5, the fiber (the carbon fiber or the glass fiber) that is of a reinforced element of the prepreg sheet 5 is divided on both the sides of the slit 6.

As illustrated in FIG. 3A, particularly in the case of the wide web 2, a lot of efforts are needed to provide the slits 6 in one large prepreg sheet 5.

As illustrated in FIG. 3B, in the case that a slit 4X parallel to the zero-degree direction with respect to the axial direction of the spar 1 is provided between the ridges 4 adjacent to each other, disadvantageously a cut line is unnecessarily increased to largely degrade strength. In the case that a central portion 5c in a width direction of the prepreg sheet 5 is matched with the ridge 4, the slit 6 is provided in the ridge 4. As a result, in the ridge 4 of the prepreg sheet 5, the fiber of the prepreg sheet 5 is divided at plural points and a reinforcement effect is insufficiently exerted.

In a production site of the spar 1, when the prepreg sheets 5 are stacked, it is necessary to continually provide the slit 6 in the prepreg sheet 5, which results in a troublesome task, needless to say. In the case that the prepreg sheet 5 is automatically bonded with a machine, the slit 6 is hardly provided on site, and actually the slit 6 is manually provided.

These problems are generated in not only the spar 1 of the wing of the aircraft, but also various structural member that are constructed by a stacked structure of the composite material.

The invention has been devised in view of the above technical problems, and an object of the invention is to provide a method for producing a structural member and the structural member, in which the structural member including the composite material can be efficiently produced such that the strength of the structural member is sufficiently ensured while the generation of the wrinkle in the composite material sheet is prevented even in the three-dimensionally curved portion of the structural member.

Solution to the Problems

To achieve the above object, the invention provides a method for producing a structural member in which a sheet-like composite material including a reinforcement fiber and a resin is used, wherein a strip-shaped first composite material sheet having a first width is bonded along a ridge having a convex cross section or a valley having a concave cross section in a structural member, and a strip-shaped second composite material sheet having a second width larger than the first width is bonded alongside the ridge or the valley in substantially parallel with the first composite material sheet.

At this point, there is no particular limitation to an order for bonding the first composite material sheet and second composite material sheet.

As described above, the first composite material sheet having the first width narrower than that of the second composite material sheet is bonded to the ridge or the valley. Thus, it is not necessary to provide the cut line alongside the ridge or the valley in the second composite material sheet.

The plural first composite material sheets each of which is cut into a predetermined length may be continuously bonded in an axial direction to a portion in which the structural member is curved in the axial direction of the structural member. Thereby, in the portion in which the structural member is curved in the axial direction, the length of the first composite material sheet can be adjusted according to a curvature of the structural member.

Preferably, the first composite material sheet width is set to about an arc length of a curved surface of the ridge or the valley.

The invention also provides a structural member that is formed by stacking plural sheet-like composite materials each of which includes a reinforcement fiber and a resin to form a plurality of layers, wherein a strip-shaped first composite material sheet having a first width is bonded along a ridge having a convex cross section or a valley having a concave cross section in a structural member, and a strip-shaped second composite material sheet having a second width larger than the first width is bonded alongside the ridge or the valley.

The plural first composite material sheets each of which is cut into a predetermined length may be continuously bonded in an axial direction to a portion in which the structural member is curved in the axial direction of the structural member.

Advantageous Effect of the Invention

According to the invention, the first composite material sheet having the first width narrower than that of the second composite material sheet is bonded to the ridge or the valley. Therefore, it is not necessary to provide the cut line in the second composite material sheet on both the sides of either the ridge or the valley, and the degradation of the total strength of structural member can be prevented.

In the case that the plural first composite material sheets each of which is divided into the predetermined length are continuously bonded in an axial direction to the portion in which the structural member is curved in the axial direction, various radii of curvature can be easily dealt with by adjusting the predetermined length.

Accordingly, the strength of the structural member is sufficiently ensured while the generation of the wrinkle in the composite material sheet constituting the structural member is prevented, and the structural member can be efficiently produced.

DESCRIPTION OF EMBODIMENT

Hereinafter, an embodiment of the invention will be described in detail with reference to the accompanying drawings.

Figure 1A:
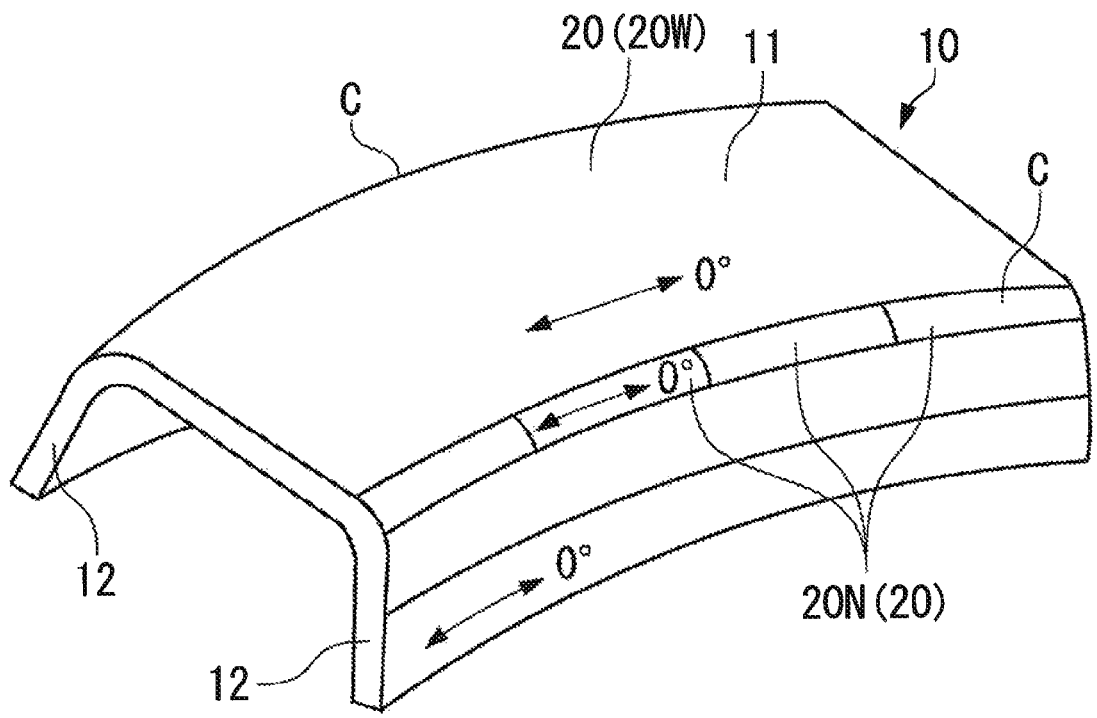
FIGS. 1A and 1B are perspective views illustrating a method for producing a structural member including a composite material in an embodiment.
Figure 1B:
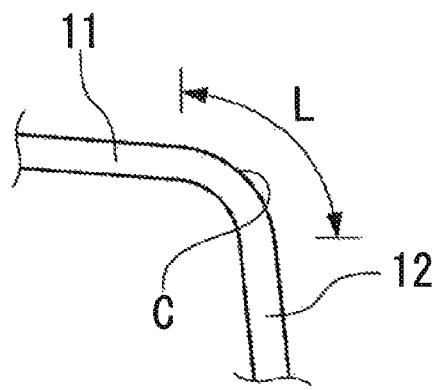

FIGS. 1A and 1B are views for explaining a spar (structural member) 10 provided in a wing of an aircraft in the embodiment.

As illustrated in FIG. 1A, in the spar 10 used as a structural member for the wing of the aircraft, a web 11 and flanges 12 and 12 extending substantially orthogonal to the web 11 from both ends of the web 11 are formed such that a section orthogonal to an axial direction of the spar 10 becomes a U-shape.

The spar 10 is made of a composite material including a carbon fiber or a glass fiber and a resin. In the embodiment, a prepreg sheet 20 in which the carbon fiber or the glass fiber is previously impregnated with the resin to form a sheet is used.

In the case that the spar 10 is constructed by such the prepreg sheet 20, the plural prepreg sheets 20 are stacked to form a plurality of layers. At this point, in each layer, the strip-shaped prepreg sheet 20 having a predetermined width is bonded such that a fiber direction of the carbon fiber or the glass fiber becomes a predetermined angle. In the prepreg sheets 20 that are vertically stacked next to one another, the prepreg sheets 20 are stacked such that the fiber direction of the prepreg sheet 20 varies. For example, when an axial direction of the spar 10 is set to 0°, the prepreg sheets 20 are sequentially stacked while a bonding direction of the prepreg sheet 20 is changed to 0°, 45°, 90°, . . . . Accordingly, the strength of the spar 10 is enhanced in many directions.

In the embodiment, in the case that the spar 10 is curved in the axial direction thereof in forming the spar 10, when the prepreg sheet 20 is bonded along the axial direction of the spar 10, a narrow prepreg sheet (first composite material sheet) 20N is bonded to a ridge C that is of a boundary portion of the web 11 and the flange 12, and a wide prepreg sheet (second composite material sheet) 20W having a width wider than that of the narrow prepreg sheet 20N is bonded to surfaces of the web 11 and the flange 12 on both sides of the ridge C.

At this point, for example, the width of the wide prepreg sheet 20W is set to 6 inches (150 mm), 12 inches (300 mm), 24 inches (600 mm) or the like, and the wide prepreg sheets 20W can be bonded while arrayed. In the case of the small spar 10, only one wide prepreg sheet 20W can be bonded.

On the other hand, the width of the narrow prepreg sheet 20N is preferably set to about an arc length L of a curved surface of the ridge C illustrated in FIG. 1B or a width slightly larger than the arc length L such that the wide prepreg sheet 20W does not cover the curved portion of the ridge C.

For example, the width of the narrow prepreg sheet 20N is set to 5 to 20 mm, more specifically to 10 mm. The generation of the wrinkle on both the sides of the narrow prepreg sheet 20N becomes less likely as the width of the narrow prepreg sheet 20N is narrowed. However, when the width of the narrow prepreg sheet 20N is excessively narrowed, it is necessary that the plural narrow prepreg sheets 20N be bonded to the ridge C while horizontally arrayed, which results in a troublesome work.

The narrow prepreg sheet 20N may be cut in each predetermined length in a length direction thereof. In such cases, the plural narrow prepreg sheets 20N are bonded in a direction, in which the ridges C are continued, so as not to be overlapped with each other in a front-back direction.

In the case that the narrow prepreg sheet 20N is cut, the predetermined length is set according to a radius of curvature of the curved portion in the axial direction of the spar 10. That is, the length of the narrow prepreg sheet 20N is set longer when the curved portion has the large radius of curvature, and the length of the narrow prepreg sheet 20N is set shorter when the curved portion has the small radius of curvature. Therefore, various radii of curvature can be easily dealt with.

As described above, in the case that the prepreg sheet 20 is bonded in the zero-degree direction with respect to the axial direction of the spar 10, basically the narrow prepreg sheet 20N is bonded along the ridge C while the wide prepreg sheets 20W are bonded to other portions. Additionally, in the case that the prepreg sheet 20 is bonded in the direction of about 10° with respect to the axial direction of the spar 10, effectively the narrow prepreg sheet 20N is bonded along the ridge C while the wide prepreg sheets 20W are bonded to other portions.

After the narrow prepreg sheet 20N is bonded along the ridge C in the zero-degree direction with respect to the axial direction of the spar 10 while the wide prepreg sheets 20W are bonded to other portions as described above, only the wide prepreg sheets 20W are bonded in predetermined angle directions different from the zero-degree direction with respect to the axial direction of the spar 10. For example, the wide prepreg sheets 20W are bonded while the bonding direction of the wide prepreg sheet 20W is changed to 45°, 90°, −45°, . . . . At this point, the wide prepreg sheet 20W is not bonded along the ridge C, but the wide prepreg sheet 20W is bonded so as to override the ridge C. Therefore, the generation of the wrinkle becomes less likely compared with the case that the prepreg sheet 20 is bonded in the zero-degree direction with respect to the axial direction of the spar 10.

For the prepreg sheet 20 that is bonded in the predetermined angle direction except the zero-degree direction with respect to the axial direction of the spar 10, it is not necessary to provide a slit in the neighborhood of the ridge C.

After the predetermined number of prepreg sheets 20 is stacked as described above, the stacked prepreg sheets 20 are covered with a film to evacuate the inside of the film, the inside of the film is heated with a predetermined temperature profile by a heater (not illustrated) while pressurized, thereby forming the spar 10.

As described above, the narrow prepreg sheet 20N is bonded along the ridge C while the wide prepreg sheets 20W are bonded to other portions. Therefore, the degradation of the total strength of the spar 10 can be prevented because the wide prepreg sheets 20W having no cut line can be bonded on both the sides of the ridge C.

In the portion in which the spar 10 is curved, the narrow prepreg sheet 20N may be bonded while divided into plural pieces in the axial direction of the spar 10. Various radii of curvature can be easily dealt with by adjusting the length of the narrow prepreg sheet 20N according to the radius of curvature of the curved portion in the axial direction of the spar 10. When proper lengths of the narrow prepreg sheets 20N are previously set according to various radii of curvature, the prepreg sheet (narrow prepreg sheet 20N and wide prepreg sheet 20W) can easily automatically be bonded with a machine.

Accordingly, the strength of the spar 10 is sufficiently ensured while the generation of the wrinkle in the prepreg sheet 20 is prevented, and the spar 10 can efficiently be produced.

In the case that the narrow prepreg sheet 20N is cut in the length direction, when the plural narrow prepreg sheets 20N are stacked to form a plurality of layers, sometimes the strength degradation possibly becomes troublesome by arraying cutting positions of the narrow prepreg sheets 20N in a thickness direction. In such cases, the strength degradation is effectively prevented by slightly displacing the cutting position in each of the stacked narrow prepreg sheets 20N.

Figure 2A:
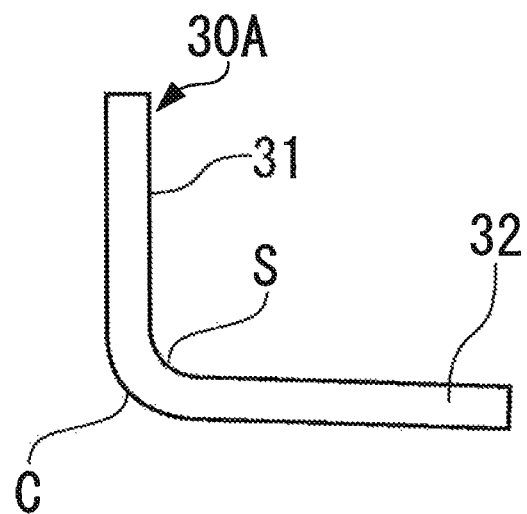
FIGS. 2A and 2B are sectional views illustrating another example of a structural member to which the invention can be applied.
Figure 2B:
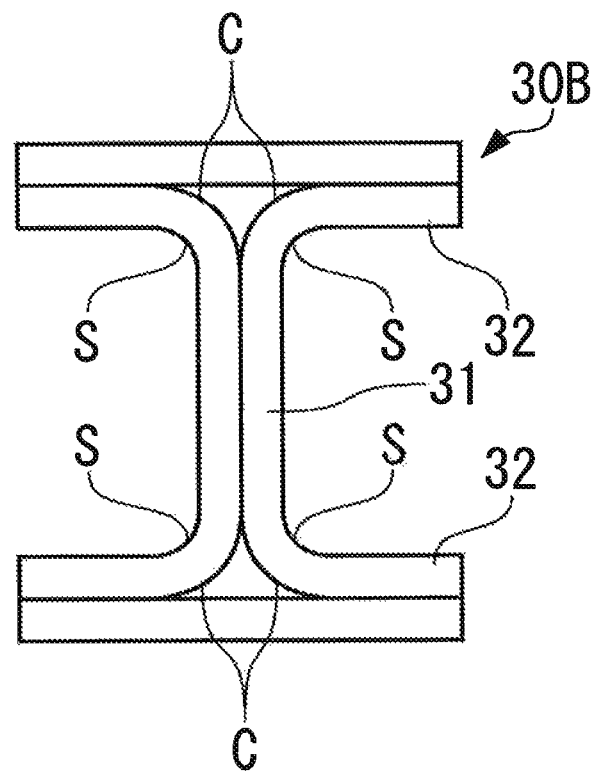
Figure 3A:
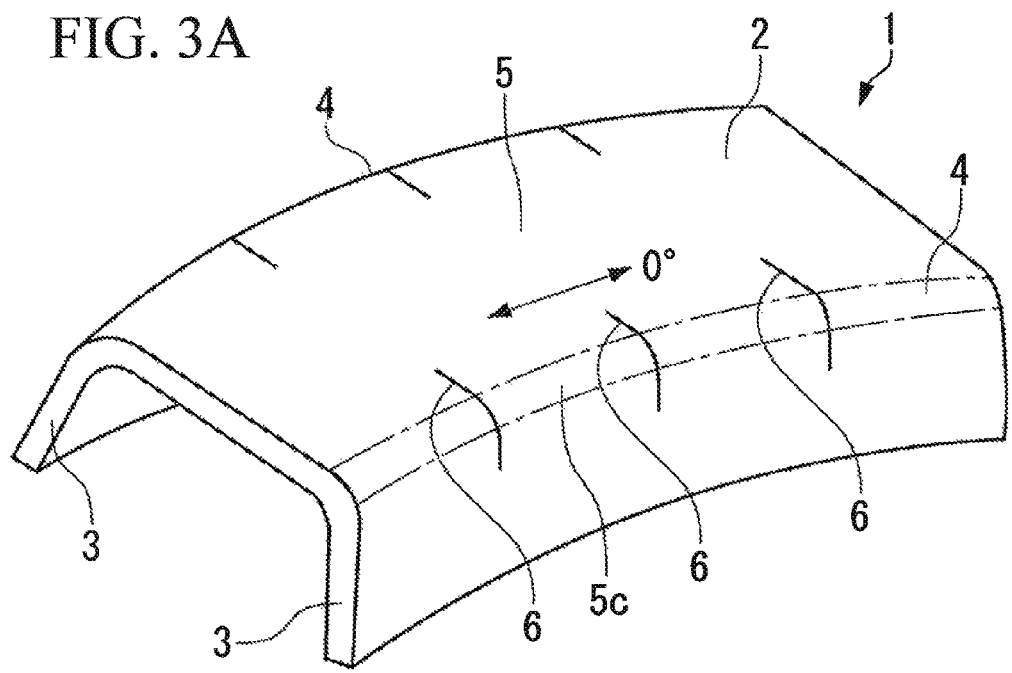
FIGS. 3A and 3B are perspective views illustrating a conventional method for producing a structural member including a composite material.
Figure 3B:
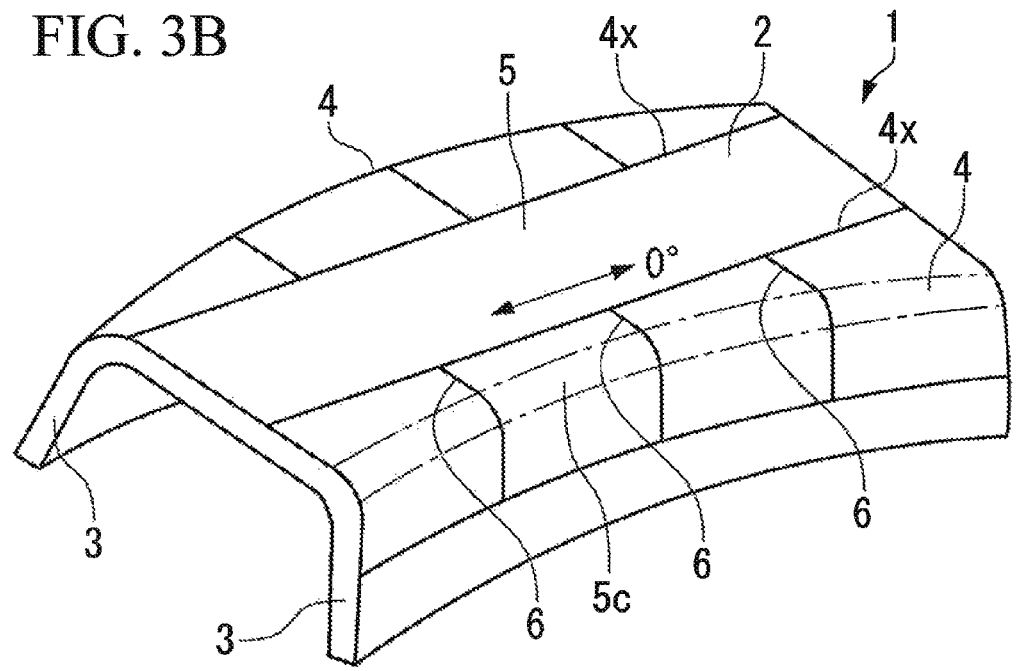

In the embodiment, by way of example, the prepreg sheet 20 is bonded along the ridge 4 having the convex shape in the spar 10 having the U-shape in section. The invention is not limited to the embodiment, and the invention can be applied to a curved portion (valley) having a concave cross section. For example, the invention can also be applied to the cases such that the ridge C or the valley S exists between a web 31 and a flange 32 and to the following structural members as long as the spar 10 is curved in the direction in which the ridge C or the valley S is continued; a structural member 30A having an L-shape in section in which the flange 32 orthogonal to the web 31 is provided in one end portion of the web 31 as illustrated in FIG. 2A, a structural member 30B having an I-shape in section in which the flanges 32 and 32 orthogonal to the web 31 are provided in both end portions of the web 31 as illustrated in FIG. 2B, and a structural member (not illustrated) having a T-shape in section. That is, similarly to the embodiment of FIGS. 1A and 1B, the narrow prepreg sheet 20N is bonded to the ridge C or the valley S, and the wide prepreg sheets 20W are bonded onto both the sides of either the ridge C or the valley S. Therefore, the generation of the wrinkle on both the sides of either the ridge C or the valley S can be prevented to obtain the same effect as the embodiment. Additionally, the invention can also be applied to another sectional shape.

The invention is not limited to the structural member for the wing of the aircraft, and the invention can also be applied to structural members of various intended use, needless to say.

The configuration of the above embodiment can be selected or appropriately changed to another configuration without departing from the scope of the invention.

REFERENCE SIGNS LIST 10 spar (structural member)
11 web
12 flange
20 prepreg sheet
20N narrow prepreg sheet (first composite material sheet)
20W wide prepreg sheet (second composite material sheet)
30A structural member
30B structural member
31 web
32 flange
C ridge
S valley

What is claimed is:

1. A method for producing a structural member comprising: bonding a strip-shaped first composite material sheet having a first width to a first portion of the structural member, the first portion comprising at least one of a ridge having a convex cross section and a valley having a concave cross section, and
bonding a strip-shaped second composite material sheet having a second width larger than the first width to a second portion of the structural member and not to the first portion, the second portion comprising at least one of a web and a flange, wherein
the second portion is adjacent to the first portion, and wherein the strip-shaped first composite material sheet and the strip-shaped second composite material sheet each comprise a reinforcement fiber and a resin, wherein
the structural member comprises an axial direction along which the structural member is curved, and wherein the strip-shaped second composite material sheet is bonded without any cuts inside its periphery.

2. The method according to claim 1, wherein at least one of the ridge and the valley comprises a curved portion and wherein the first width of the strip-shaped first composite material sheet is approximately equal to an arc length of the curved portion.

3. The method of claim 1, comprising bonding the strip-shaped first composite material sheet in a first angle direction extending along an axial direction of the structural member.

4. The method according claim 3, comprising bonding the strip-shaped second composite material sheet in the first angle direction so as to be substantially parallel to the strip-shaped first composite material sheet, and bonding an additional strip-shaped second composite material sheet to the second portion and not to the first portion, wherein the additional strip-shaped second composite material sheet is bonded in a second angle direction, wherein the second angle direction is different from the first angle direction.

5. The method according to claim 1, wherein each of the strip-shaped first composite material sheet and the strip-shaped second composite material sheet is a prepreg sheet.

6. A method for producing a structural member comprising: bonding a strip-shaped first composite material sheet having a first width to a first portion of the structural member, the first portion comprising at least one of a ridge having a convex cross section and a valley having a concave cross section, and bonding a strip-shaped second composite material sheet having a second width larger than the first width to a second portion of the structural member and not to the first portion, the second portion comprising at least one of a web and a flange, wherein the second portion is adjacent to the first portion, and wherein the strip-shaped first composite material sheet and the strip-shaped second composite material sheet each comprise a reinforcement fiber and a resin, wherein the strip-shaped first composite material sheet is cut into a plurality of pieces that are continuously bonded to the first portion in an axial direction of the structural member.

7. A structural member comprising: a second portion adjacent to a first portion, wherein the second portion comprises at least one of a web and a flange and wherein the first portion comprises at least one of a ridge having a convex cross section and a valley having a concave cross section, wherein a strip-shaped first composite material sheet having a first width is bonded to the first portion, and a strip-shaped second composite material sheet having a second width larger than the first width is bonded to the second portion and not the first portion, wherein the strip-shaped first composite material sheet and the strip-shaped second composite material sheet each comprise a reinforcement fiber and a resin, wherein the structural member comprises an axial direction along which the structural member is curved, and wherein the strip-shaped second composite material sheet is bonded without any cuts inside its periphery.

8. The structural member according to claim 7, wherein at least one of the ridge and the valley comprises a curved portion and wherein the first width of the strip-shaped first composite material sheet is approximately equal to an arc length of the curved portion.

9. The structural member according to claim 7, wherein the strip-shaped first composite material sheet is bonded in a first angle direction extending along an axial direction of the structural member.

10. The structural member according to claim 9, wherein the strip-shaped second composite material sheet is bonded in the first angle direction so as to be substantially parallel to the strip-shaped first composite material sheet, and wherein the structural member comprises an additional strip-shaped second composite material sheet that is bonded to the second portion and not the first portion, wherein the additional strip-shaped second composite material sheet is bonded in a second angle direction, wherein the second angle direction is different from the first angle direction.

11. The structural member according to claim 7, wherein each of the strip-shaped first composite material sheet and the strip-shaped second composite material sheet is a prepreg sheet.

12. The structural member according to claim 7, wherein a section orthogonal to an axial direction of the structural member is substantially U-shaped.

13. The structural member according to claim 7, wherein the structural member is a spar.

14. The A structural member comprising: a second portion adjacent to a first portion, wherein the second portion comprises at least one of a web and a flange and wherein the first portion comprises at least one of a ridge having a convex cross section and a valley having a concave cross section, wherein a strip-shaped first composite material sheet having a first width is bonded to the first portion, and a strip-shaped second composite material sheet having a second width larger than the first width is bonded to the second portion and not the first portion, wherein the strip-shaped first composite material sheet and the strip-shaped second composite material sheet each comprise a reinforcement fiber and a resin, wherein the strip-shaped first composite material is cut into a plurality of pieces that are continuously bonded to the first portion in an axial direction of the structural member.

* * * * *